Sept. 21, 1948.    O. SEITZ    2,449,754
FITTING FOR CONNECTING PIPES BY WELDING Filed Aug. 25, 1945

Inventor:
Oskar Seitz,
By
Pierce & Scheffler,
Attorneys.

Patented Sept. 21, 1948

2,449,754

UNITED STATES PATENT OFFICE 2,449,754

FITTING FOR CONNECTING PIPES BY WELDING

Oskar Seitz, Baden, Switzerland

Application August 25, 1945, Serial No. 612,587
In Switzerland December 20, 1943

Section 1, Public Law 690, August 8, 1946
Patent expires December 20, 1963

7 Claims. (Cl. 285—111)

Up to the present standard steel pipes, particularly gas pipes, have been joined together by means of screwed fittings the shape of which is made to suit the pipes in question. Since there are, however, not only straight, angular, bent, T and cross connections as well as elbow and branched pieces for pipes of the same diameter, but also connecting pieces for all sorts of possible combinations of diameters, the number of such fittings amounts to thousands. Each fitting requires its own casting or pressing mould so that these fittings are not cheap even when mass-produced.

Of late the pipe ends are frequently connected together by welding, at least in such installations where the pipes are not likely to have to be disconnected. Where the pipes are joined together in a straight line and have the same diameter this form of connection can easily be made. When, however, the pipes have different diameters or change their direction, and in the case of branch pipes, it is expedient or even necessary to insert intermediate pieces, so-called "weld fittings."

In order to be able to make as many welded connections as is the case when using screwed fittings, the same number of patterns for weld fittings would have to be made as there are screwed fittings.

This is avoided according to the present invention and the number of patterns required for weld fittings is reduced to a small fraction of that required for screwed fittings.

This is achieved by at least one of the openings of the fitting having an extension whose diameter decreases towards its free end so as to correspond to a series of pipes of different diameter to which it is to be welded. When the fitting is to be used, the end of the extension is cut off up to the diameter corresponding to the pipe to which it is to be welded.

Figure 1:
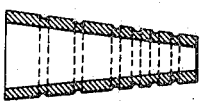
Figure 2:
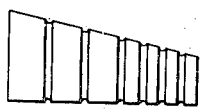
Figure 3:
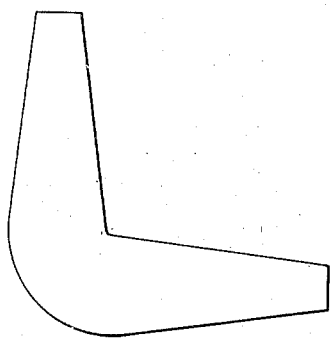
Figure 4:
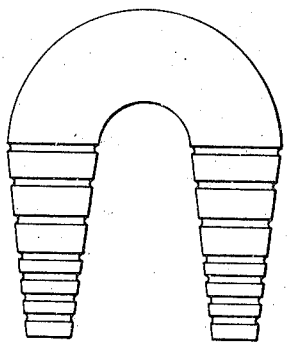
Figure 5:
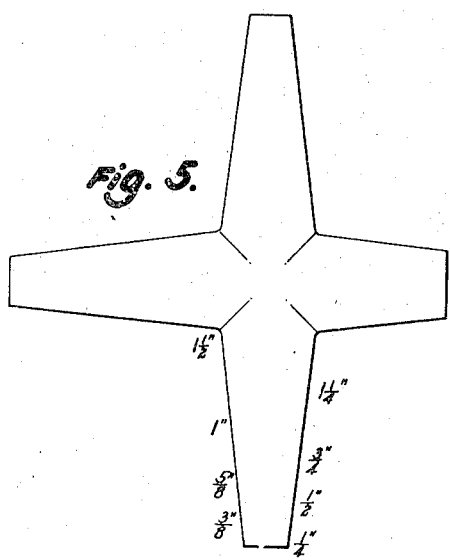
Figure 6:
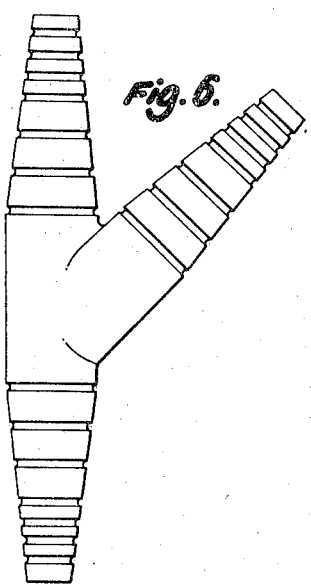

A number of constructional examples of the invention are illustrated in the accompanying drawing where Fig. 1 shows a concentric and Fig. 2 an eccentric straight reducing piece; Fig. 3 a pipe bend; Fig. 4 a double bend; Fig. 5 a rectangular cross-piece; Fig. 6 a branched piece. Fig. 1 is a longitudinal section whilst the other figures show the fitting in elevation. Naturally all other forms, such as can be obtained with screwed fittings, are possible.

Figure 7:
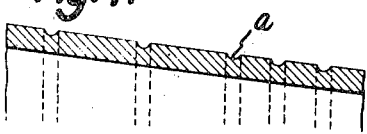
Figure 8:
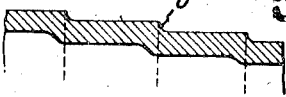

Figs. 7 and 8 show two alternative forms of the wall of the extension piece in longitudinal section. At the points where the extensions of the fittings are welded to the pipes it is advisable to provide rounded grooves $a$ when the fitting is conical as shown in Fig. 7, or steps $b$ whose concave corner is rounded as in Fig. 8. Grooves having other shapes can also be used. Each groove or step corresponds to the diameter of a standard pipe as is for instance indicated on the fittings shown in Figs. 4 and 5.

If for instance a pipe with an internal diameter of ¾" has to be connected, then the extension is cut off at the groove or step marked ¾" so that the internal and external diameter of the pipe to be welded exactly matches the fitting. This is indicated for the right-hand extension of the cross-piece shown in Fig. 5.

How big the series of different pipe diameters has to be made must be determined by accurate calculations, so that on the one hand the fittings do not become too numerous or heavy, or that too much material is wasted when the extensions are cut off, and on the other hand due consideration must be paid to the fact that it is not desirable that too many different kinds of fittings should have to be kept in stock. It is also conceivable that fittings can be kept in stock with extensions for only a few pipe diameters, for instance three, in addition to fittings for a larger number of pipe diameters, for instance ten. It is also possible to produce fittings with a coarser graduation of pipe diameters where various steps, for instance every second step is omitted, or where the graduation is not in accordance with a single cone but with several cones of different pitch, or according to a curve.

The wall thickness of the conical or stepped extension can either be constant or decrease towards the end.

The conical form of extension shown in Figs. 1–7 also enables pipes with abnormal diameters to be welded; in such a case the extension is cut off at the desired point between two adjoining grooves. If desired the grooves or steps can be entirely dispensed with.

The conical or stepped extensions can also be fitted on to other pipe elements such as flanges, tube nipples, connecting nipples for union nuts, valve casings, etc. Weld fittings can also be manufactured where one or more graduated extensions are missing or where there is only a single extension.

I claim:

1. A universal pipe fitting for connection by welding between pipe ends of the same or different diameters including a unitary connecting member having at least one integral extension nipple of substantially tapering form comprising demarked integral severable sections each having a diameter at the point of demarcation corresponding to a standard pipe size whereby upon the severance of any selected one of which an end surface will be provided on the remaining unsevered part of the nipple of a diameter appropriate for connection by welding to a pipe end of corresponding diameter.

2. A universal pipe fitting for connection by welding between pipe ends of the same or different diameters including a unitary connecting member having a plurality of branches for connection to said pipe ends, at least one of said branches comprising an integral extension nipple of substantially tapering form comprised of a plurality of demarked severable integral sections each having a diameter at the point of demarcation corresponding to a standard pipe size whereby upon the severance of any selected one of which an end surface will be provided on the remaining unsevered part of a diameter appropriate for connection by welding to a pipe end of corresponding diameter to which the fitting is to be welded.

3. A universal pipe fitting for connection by welding between pipe ends of the same or different diameters including a unitary connecting member a plurality of integral extension nipples of substantially tapering form comprising demarked integral severable sections each having a diameter at the point of demarcation corresponding to a standard pipe size whereby upon the severance of any selected one of which an end surface will be provided on the remaining unsevered part of a diameter appropriate for connection by welding to a pipe end of corresponding diameter.

4. A fitting as defined in claim 1 in which the extension nipple is formed with a plurality of spaced parallel circumferential grooves delineating the severable sections thereof.

5. A fitting as defined in claim 2 in which the extension nipple is formed with a plurality of spaced parallel circumferential grooves delineating the severable sections thereof.

6. A fitting as defined in claim 1 in which the severable sections are stepped sections of progressively lesser diameter in the direction of the free end of the nipple and in which each of said stepped sections is of a diameter corresponding to a standard diameter of pipe.

7. A universal pipe fitting for connection by welding between pipe ends of the same or different diameters including a unitary connecting member having a plurality of branches for connection to said pipe ends, at least one of said branches comprising an integral extension nipple tapering from a maximum diameter corresponding to one standard diameter of pipe to a minimum diameter corresponding to a smaller standard diameter of pipe and having intermediate circumferential lines of demarcation dividing the same into sections each having a diameter at the line of demarcation corresponding to a standard diameter of pipe intermediate the maximum and minimum diameters of the tapered portion thereof.

OSKAR SEITZ.

REFERENCES CITED

The following references are of record in the file of this patent:

UNITED STATES PATENTS

| Number | Name | Date |
| --- | --- | --- |
| 186,351 | Leland | Jan. 16, 1877 |
| 872,331 | Dreier | Dec. 3, 1907 |
| 2,154,407 | Miller | Apr. 11, 1939 |
| 2,344,424 | Singleton | Mar. 14, 1944 |

FOREIGN PATENTS

| Number | Country | Date |
| --- | --- | --- |
| 189,258 | Germany | Oct. 5, 1907 |